Aug. 31, 1948.  J. WOLFF  2,448,067
DEVICE FOR THE MANUFACTURE OF
ARTIFICIAL SAUSAGE SKINS
Filed Dec. 2, 1941
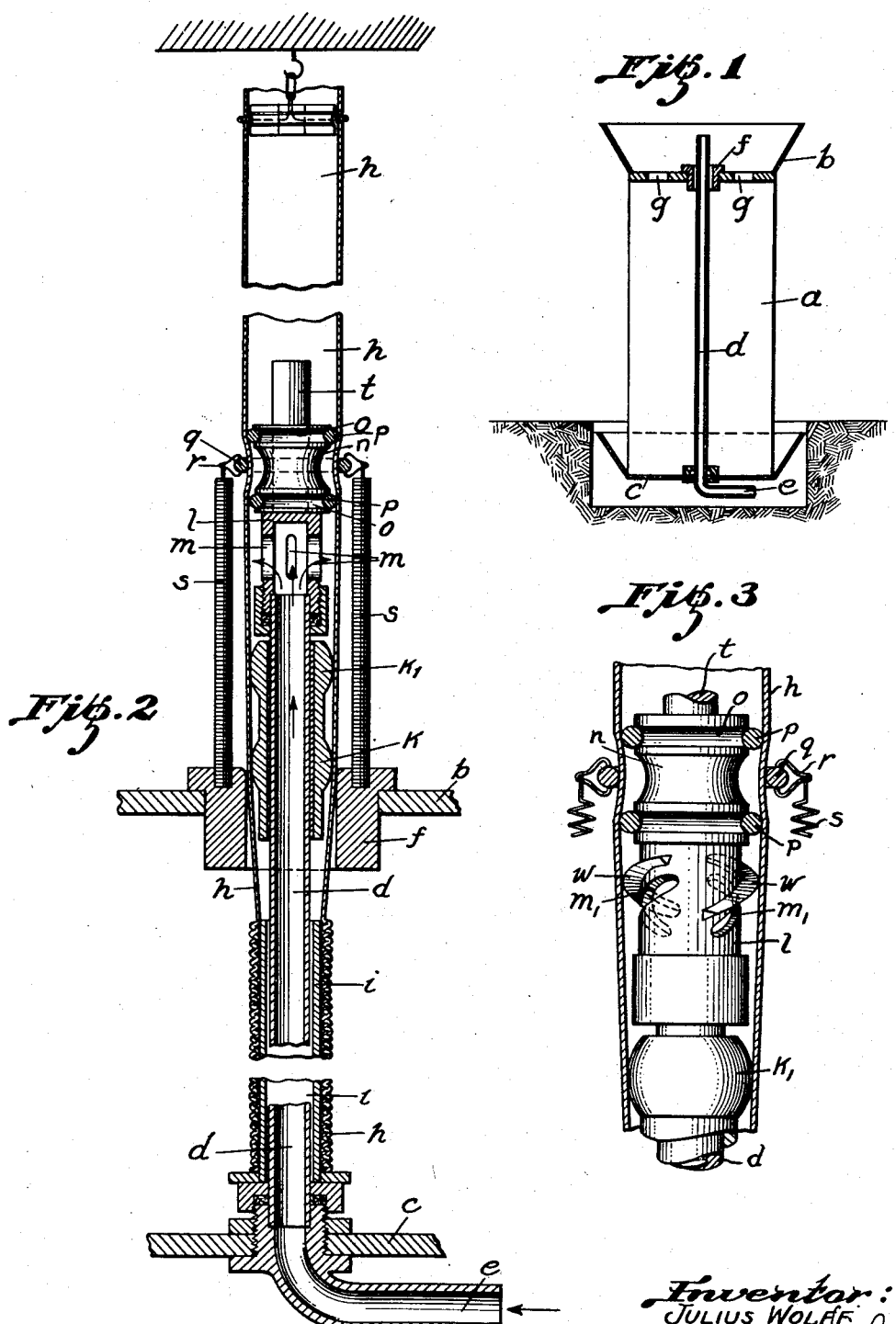

Patented Aug. 31, 1948

2,448,067

UNITED STATES PATENT OFFICE 2,448,067

DEVICE FOR THE MANUFACTURE OF ARTIFICIAL SAUSAGE SKINS

Julius Wolff, Amstenrade, Netherlands, vested in the Attorney General of the United States Application December 2, 1941, Serial No. 421,395
In Germany June 1, 1938

14 Claims. (Cl. 91—32)

The present invention relates to a device for the manufacture of artificial sausage skins.

It is well known to make artificial sausage skins from fabric tubes or the like impregnated with suitable materials, whereby the tubes are withdrawn from vertical mandrels, guided through annular gaps and passed upwardly, whereupon they are dried and further treated. With these known methods the impregnation of the tubes in most cases was effected from the outside. However, it has also been proposed to impregnate from the inside. Now, in accordance with the invention the fabric tube is to be impregnated simultaneously within and without with the same mass. The impregnation effected from the outside is carried out in the hitherto usual manner, whereas the impregnation effected from the inside is carried out by suitable devices mechanically pressing the mass into the interior of the tube. The mass thereby is pressed against the inner wall of the tube and is then smoothened by wiper rings, whereas the superfluous material is stripped off.

The principal effect obtained hereby is that the fabric tube is completely embedded into the organic impregnating mass. This is of particular importance if the tube-like fabric totally or partially consists of artificial silk which itself is less suitable for the purposes of the invention than natural silk. The tube having both sides impregnated in accordance with the method of the invention, is then treated with an air current flowing through the tube until it is completely dry. In a manner known per se, the upper end of the tube is suspended from a ring so that the air flowing in from below may escape again at the upper end. In this manner the sausage skin is maintained tight until it is completely dry and, therefore, during drying no folds or crumples are formed which would contribute to weaken the sausage skin. Due to the fact that the inflowing air may escape at the upper end, the impregnating mass which is introduced into the sausage skin is not pressed outwardly through the loops of the fabric. The double impregnation, i. e. the within and without impregnation, is of particular importance as hereby the tube-like fabric is completely embedded into the impregnating mass, whereas with an impregnation at one side only, the other side of the tube-like fabric often was left completely free and could be withdrawn from the hardened impregnating layer. Now, for the manufacture of the fabric, serving as skeleton for the sausage skin, such fibrous materials may be used which are sensitive to moisture or atmospheric actions. Moreover, this double impregnation causes a substantial reinforcement and a considerable denseness of the sausage skin. However, as the impregnating mass is porous like a skin, the sausage skin, in spite of the considerably increased denseness, maintains the necessary porosity, so that the sausage mass incorporated in the sausage skin may sufficiently exhale. The respiration of the sausage skin therefore, is not influenced by the double impregnation.

Moreover, the inside impregnation may, in accordance with the invention, be carried out in such a manner that here the fibres of the mass obtain another direction as the fibres of the outside impregnation. If the latter is effected for instance vertically by drawing upwardly the sausage skin through an annular nozzle, the fibres of the inside impregnation may receive a helical direction upon the inner wall of the tube for instance under an angle of 45° towards the left or towards the right. If, however, the outside impregnation also is effected helically, then the inside impregnation is effected in the same manner but in an inversed direction, that is to say, with a right hand rotation at the outside in a left hand rotation at the inside or vice versa. In any case a position of the fibres of the mass crossing each other is obtained which causes a further substantial reinforcement of the sausage skin. Such a helical impregnation may, for instance, be obtained by correspondingly guiding the mass against the outer and inner wall of the tube respectively.

In the accompanying drawing a device for carrying out the method according to the invention is shown by way of example.

In this drawing:

Fig. 1 shows a sectional view of the total arrangement of a device according to the invention without representing details, and Fig. 2 is a section through the impregnating device.

Fig. 3 is a sectional detail showing a modification of the impregnation means.

Mounted upon a frame $a$ is a supply trough $b$ for the reception of the impregnating mass. The lower bottom $c$ of the frame $a$ supports a tube $d$ to which the supply pipe $e$ is connected arranged outside the frame $a$. The mass is by way of a hose supplied to the pipe $d$, for instance, from a pump or a tank arranged at a higher level. The vertical pipe $d$ extends through an annular nozzle $f$ which is held in a bottom opening $g$ of the trough $b$. In other openings $g$ any desired number of annular nozzles $f$ with appertaining stand pipes $d$ may be arranged depending on the number of artificial sausage skins to be impregnated and drawn upwardly. With regard to the stand pipe $d$ the annular nozzle $f$ has so much play that the fabric tube $h$ may easily be passed through. This fabric is mounted upon a special supporting tube $i$ which is shifted upon the stand pipe $d$ after the annular nozzle $f$ has previously been withdrawn.

In a manner known per se the fabric tube $h$ is drawn upwardly through the annular nozzle $f$ and suspended from the ceiling. In the interior of the tube and above the annular nozzle $f$ a spacer member $k$ having a convex outer surface is mounted upon the pipe $d$. This spacer member $k$ extends close to the upper discharge end of the nozzle $f$ and at this point provides a small annular gap for the passage of the tube. Somewhat above this spacer member a second spacer member $k_1$ having a convex outer surface is mounted upon the pipe $d$ which preferably is connected to the lower spacer member $k$ by an intermediate pipe member. The spacer member $k_1$ at this point maintains the tube slightly tensioned. Mounted upon the upper end of the stand pipe $d$ is a tube-like nozzle $l$ with lateral slots $m$ through which the impregnating mass penetrates into the intermediate space between the nozzle and the wall of the tube. Here the impregnating mass comes into intimate contact with the fabric, whereas simultaneously also the mass present in the trough $b$ impregnates the tube from the outside. Mounted at the upper end of the nozzle $l$ is a shank $t$ for setting up a head $n$ which is provided with external grooves $o$ which are arranged in spaced relation one above the other and serve the purpose of holding wiper rings $p$. The latter slightly stretch the tube from the inside so that the mass is smoothened down at the inner wall. Midway between the rings $p$, however, a wiper ring $q$ is provided which surrounds the tube at the outside and which is slightly floatingly and resiliently held for instance by connecting same by means of thin wires or threads $r$ to vertically arranged helical or coiled springs $s$, the lower ends of which extend into bores of the annular nozzle $f$ and are fixed therein. In this manner the outer wiper ring $q$ may freely move into all directions and may easily and resiliently adapt itself to the movements of the tube. The inner diameter of the ring $q$ is somewhat smaller than the outer diameter of the rings $p$, whereby at this point a certain contraction of the tube is caused.

To apply the impregnating mass within in a helical direction to the wall of the tube $h$, corresponding guides indicating the direction, for instance, obliquely arranged or helical ledges $w$, may easily be provided on member $l$ (Fig. 3). Moreover, the slots may correspondingly be arranged obliquely or helically as shown by $m_1$ in Figure 3.

The device for carrying out the new method could, of course, more or less depart from the construction shown by way of example without departing from the spirit of the invention.

What I claim is:

1. A device for impregnating fabric tubes with a fibrous coating mass, comprising a pipe over which said tube is adapted to be inserted and through which said mass is conducted, said pipe being provided near one end thereof with lateral discharge orifices by way of which the mass from the pipe penetrates into the intermediate space between said pipe and the inside wall of said tube, the discharge axes of said orifices being inclined relative to the longitudinal axes of the pipe and the surrounding tube.

2. In a device as set forth in claim 1, in which said lateral discharge orifices of the internal pipe, supplying the mass, are inclined in a helical direction relative to the pipe so that the mass reaches the inside wall of said tube in a corresponding helical direction.

3. A device as set forth in claim 1, further comprising a wiper- and smoothening ring provided above the discharge point of the mass and inside the tube, and means offset longitudinally of the tube relative to said ring for guiding the inside tube wall into engagement with said ring.

4. A device as set forth in claim 1, further comprising a plurality of wiper- and smoothening rings provided above the discharge point of the mass and inside the tube, and means offset longitudinally of the tube relative to said rings for guiding the inside tube wall into engagement with said rings.

5. A device as set forth in claim 1, further comprising a shank attached to said pipe, a supporting member having an axial bore and fitted to said shank, wiper- and smoothening rings mounted in grooves of said supporting member inside said fabric tube, and means offset longitudinally of the tube relative to said rings for guiding the inside tube wall into engagement with said rings.

6. A device for impregnating fabric tubes with a coating mass, comprising a pipe over which said tube is adapted to be inserted and through which said mass is conducted, said pipe being provided near one end thereof with lateral discharge orifices by way of which the material from the pipe penetrates into the intermediate space between said pipe and the inside wall of said tube, the discharge axes of said orifices being inclined relative to the longitudinal axes of the pipe and the surrounding tube, a grooved supporting member arranged at the head of the supply pipe, a pair of wiper- and smoothening rings mounted inside said fabric tube in the grooves provided in said supporting member, an external wiper ring mounted between said pair of wiper- and smoothening rings, and elastic members holding said external wiper ring, the inner diameter of said external wiper ring being smaller than the outer diameter of said wiper- and smoothening rings.

7. A device for impregnating fabric tubes with a coating mass, comprising a pipe over which said tube is adapted to be inserted and through which said mass is conducted, said pipe being provided near one end thereof with lateral discharge orifices by way of which the material from the pipe penetrates into the intermediate space between said pipe and the inside wall of said tube, the discharge axes of said orifices being inclined relative to the longitudinal axes of the pipe and the surrounding tube, a grooved supporting member arranged at the head of the supply pipe, a pair of wiper- and smoothening rings mounted inside said fabric tube in the grooves provided in said supporting member, an external wiper ring mounted between said pair of wiper- and smoothening rings, and freely mounted helical springs holding said external wiper ring, the inner diameter of said external wiper ring being smaller than the outer diameter of said wiper- and smoothening rings.

8. A device for impregnating fabric tubes with a coating mass, comprising a pipe over which said tube is adapted to be inserted and through which said mass is conducted, said pipe being provided near one end thereof with lateral discharge orifices by way of which the material from the pipe penetrates into the intermediate space between said pipe and the inside wall of said tube, th discharge axes of said orifices being inclined relative to the longitudinal axes of the pipe and the surrounding tube, a spacer member having a convex outer surface arranged inside said tube below the discharge point of the mass in a position contacting said tube with slight tension.

9. A device for impregnating fabric tubes with a coating mass, comprising a pipe over which said tube is adapted to be inserted and through which said mass is conducted, said pipe being provided near one end thereof with lateral discharge orifices by way of which the material from the pipe penetrates into the intermediate space between said pipe and the inside wall of said tube, the discharge axes of said orifices being inclined relative to the longitudinal axes of the pipe and the surrounding tube, a plurality of spacer members arranged inside said tube in spaced relation to each other and below the discharge point of said mass, each of said spacer members having a convex outer surface and both said spacer members contacting said tube with slight tension.

10. A device for impregnating fabric tubes with a fibrous coating mass, comprising a pipe over which said tube is adapted to be inserted and through which said mass is conducted, said pipe being provided near one end thereof with lateral discharge orifices by way of which the mass from the pipe penetrates into the intermediate space between said pipe and the inside wall of said tube, a grooved supporting member arranged at the head of the supply pipe, a pair of wiper- and smoothening rings mounted inside said fabric tube in the grooves provided in said supporting member, an external wiper ring mounted between said pair of wiper- and smoothening rings, and elastic members holding said external wiper ring, the inner diameter of said external wiper ring being smaller than the outer diameter of said wiper- and smoothening rings.

11. A device for impregnating fabric tubes with a fibrous coating mass, comprising a pipe over which said tube is adapted to be inserted and through which said mass is conducted, said pipe being provided near one end thereof with lateral discharge orifices by way of which the mass from the pipe penetrates into the intermediate space between said pipe and the inside wall of said tube, a grooved supporting member arranged at the head of the supply pipe, a pair of wiper- and smoothening rings mounted inside said fabric tube in the grooves provided in said supporting member, an external wiper ring mounted between said pair of wiper- and smoothening rings, and freely mounted helical springs holding said external wiper ring, the inner diameter of said external wiper ring being smaller than the outer diameter of said wiper- and smoothening rings.

12. A device for impregnating fabric tubes with a fibrous coating mass, comprising a pipe over which said tube is adapted to be inserted and through which said mass is conducted, said pipe being provided near one end thereof with lateral discharge orifices by way of which the mass from the pipe penetrates into the intermediate space between said pipe and the inside wall of said tube, a spacer member having a convex outer surface arranged inside said tube below the discharge point of the mass in a position contacting said tube with slight tension.

13. A device for impregnating fabric tubes with a fibrous coating mass, comprising a pipe over which said tube is adapted to be inserted and through which said mass is conducted, said pipe being provided near one end thereof with lateral discharge orifices by way of which the mass from the pipe penetrates into the intermediate space between said pipe and the inside wall of said tube, a plurality of spacer members arranged inside said tube in spaced relation to each other and below the discharge point of said mass, each of said spacer members having a convex outer surface and both said spacer members contacting said tube with slight tension.

14. A device for impregnating fabric tubes with a fibrous coating mass, comprising a pipe over which said tube is adapted to be inserted and through which said mass is conducted, said pipe being provided near one end thereof with lateral discharge orifices by way of which the mass from the pipe penetrates into the intermediate space between said pipe and the inside wall of said tube, the discharge axes of said orifices being inclined relative to the longitudinal axes of the pipe and the surrounding tube, and correspondingly inclined guides disposed in said space for engaging the inside wall of said tube and the discharged mass whereby the fibres in the mass are inclined along said inner wall surface relative to the longitudinal axes of the pipe and surrounding tube.

JULIUS WOLFF.

REFERENCES CITED

The following references are of record in the file of this patent:

UNITED STATES PATENTS

| Number | Name | Date |
|---|---|---|
| 1,613,119 | Nelson | Jan. 4, 1927 |
| 1,914,455 | Pahl | June 20, 1933 |
| 2,100,587 | Chalker | Nov. 30, 1937 |
| 2,105,273 | Smith | Jan. 11, 1938 |
| 2,125,025 | Huckfeldt et al. | July 26, 1938 |
| 2,260,282 | Grint | Oct. 28, 1941 |
| 2,350,857 | Wolff | June 6, 1944 |